United States Patent [19]
Ohno

[11] Patent Number: 5,818,905
[45] Date of Patent: Oct. 6, 1998

[54] SUBSCRIBER LINE IMPEDANCE MEASUREMENT METHOD AND MEASURING CIRCUIT

[75] Inventor: Masahiko Ohno, Tokyo, Japan

[73] Assignee: NEC Corporation, Tokyo, Japan

[21] Appl. No.: 779,220

[22] Filed: Jan. 6, 1997

[30] Foreign Application Priority Data

Jan. 8, 1996 [JP] Japan ................................. 8-000799

[51] Int. Cl.$^6$ .............................. H04M 3/08; H04M 3/22; H04M 1/24; G08B 23/00
[52] U.S. Cl. ............................ 379/30; 379/24; 324/603; 324/522
[58] Field of Search .................................... 379/1, 2, 5, 6, 379/21, 22, 24, 26, 27, 28, 29, 30, 32; 324/522, 523, 527, 603, 607, 649, 556, 642, 618; 370/250, 251

[56] References Cited

U.S. PATENT DOCUMENTS

| | | | |
|---|---|---|---|
| 4,853,950 | 8/1989 | Crane | 379/24 |
| 5,444,759 | 8/1995 | Vogt, III et al. | 379/30 |
| 5,465,287 | 11/1995 | Egozi | 379/27 |
| 5,661,776 | 8/1997 | Charland | 379/30 |

FOREIGN PATENT DOCUMENTS 3-163369  7/1991  Japan .

*Primary Examiner*—Paul Loomis
*Attorney, Agent, or Firm*—Foley & Lardner

[57] ABSTRACT

A measurement method and measuring circuit are described for high-speed measurement of subscriber line impedance without the influence of counter electromotive force of the bell circuit or hum noise. A measurement current is supplied from a controlled-current source to each of a pair of subscriber lines by way of switches, and subscriber line voltage and current values are measured during the transient state. A measurement time interval is divided into a first-half and a second-half interval, the average values of the voltage and current are detected for each time interval, and moreover, the difference between voltages at the beginning and end of each time interval is detected. In this case, the controlled-current source is controlled by a control means such that the rate of change of the current value over time remains at or below a fixed value. The combined equivalent resistance and equivalent capacitance of subscriber lines and terminals are then computed using the detected values according to a preset numerical formula.

12 Claims, 6 Drawing Sheets

SUBSCRIBER LINE IMPEDANCE MEASUREMENT METHOD AND MEASURING CIRCUIT

BACKGROUND OF THE INVENTION

1. Field of the Invention

The present invention relates to measurement of communication lines and particularly to technology for measuring impedance of metallic paired lines for use in testing subscriber lines, and in particular, relates to a measurement method and measuring circuit for measuring impedance between lines of a metallic paired lines and impedance between a single line and ground.

2. Description of the Related Art

One example of a subscriber line impedance measuring circuit of the prior art includes a circuit system and a step in which voltage that changes at a fixed speed is applied to subscriber lines and capacitance is calculated from the average current of the subscriber line during this period of impressed voltage, and a step in which a fixed voltage is applied to subscriber lines and resistance is calculated from the average current of the subscriber line during this period of impressed voltage (refer to Japanese Patent Laid-open No. 163369/91).

In this prior-art subscriber line impedance measuring circuit, an operation is required by which the impressed voltage is changed within the measurement period from a waveform that changes at a fixed speed to a waveform of a fixed level, and the circuit is accordingly complex.

In addition, the subscriber lines are driven by a voltage source of low-output impedance, and this introduces the problem that when the hum noise of a commercial power source is superposed onto subscriber lines, the hum noise current flows into the voltage source and thereby adversely influences that circuit or other circuits via the power source line.

A measurement current based on the applied voltage is generally set to a value on the order of 1 mA or lower so as not to cause the bell circuit within a telephone to ring. On the other hand, the hum noise current, while dependent on environmental conditions, flows at a maximum on the order of 10 mA. This greater magnitude of the level of the hum noise current over that of the measurement current gives rise to error in measuring the circuit current.

In addition, the sum current of the hum noise (an alternating current) and the direct current for measurement purposes flows in the voltage source, and for the measuring circuit, this combined current flows in both directions: source and sink. Generally, the design of, for example, current buffers is more difficult for a bidirectional circuit than for a unidirectional circuit in which the current flows in only one direction, and as a result, there is the additional drawback of complexity of the voltage source circuit.

SUMMARY OF THE INVENTION

The present invention was achieved in view of these problems and has the object of providing an impedance measurement method and measuring circuit which enable high-speed measurement of subscriber line impedance. In other words, the object of the present invention is to provide an impedance measurement method and measuring circuit that prevent the occurrence of transient noise and have high measurement accuracy. Another object of the present invention is to provide an impedance measurement method and measuring circuit that are not prone to influence from hum noise. Finally, another object of the present invention is to provide an impedance measurement method and measuring circuit that simplify circuit construction.

To achieve the above-described objects, the subscriber line impedance measurement method of the present invention is a measurement method by which:

a controlled-current source is connected to a subscriber line, and current is allowed to flow, giving rise to a transient state;

a measurement time interval set within the duration of the transient state is divided into two intervals, the voltage difference between subscriber line voltages at the beginning and end of each of the two intervals is measured, and the average voltage and average current of the subscriber line over each of the two intervals is measured; and subscriber line impedance is calculated by using the obtained measurement values in a prescribed numerical formula corresponding to the transient state of the subscriber lines.

This controlled-current source controls the rate of change over time of the current to a fixed value or lower at the time of connecting the controlled-current source to a subscriber line. In this case, the subscriber lines are a pair of metallic lines, one of which is connected to the controlled-current source and the other is connected to ground, or is disconnected, and impedance between subscriber lines or subscriber line-to-ground impedance is measured from the subscriber line on the controlled-current source side. The subscriber line impedance measuring circuit according to the present invention is composed of: a controlled-current source connected to one of the subscriber lines and through which current passes;

voltage difference detection means that detects voltage difference between subscriber line voltages at the beginning and end of each of two intervals, the intervals being predetermined by dividing into two intervals a time interval of initial transient state occurring when the controlled-current source is connected and current first flows;

average voltage/current detection means that measures average voltage and average current of the subscriber line over each of a first-half interval and a second-half interval of the time interval of initial transient state; and arithmetic means that calculates subscriber line impedance using the detected voltage differences, the average voltages and the average currents in a prescribed numerical formula corresponding to the transient conditions of the subscriber lines.

This controlled-current source controls the rate of change over time of the current to a fixed value or lower at the time of connecting the controlled-current source to a subscriber line. In this measuring circuit, moreover, one of the metallic paired lines is connected to the controlled-current source and the other is connected to ground, or is disconnected; and impedance between subscriber lines or subscriber line-to-ground impedance is measured from the subscriber line on the controlled-current source side.

In both subscriber line impedance measurement method and measuring circuit of the present invention as described hereinabove, the two measurement time intervals are a first half and a second half of a fixed time interval within the transient state that are continuous from the time at which the controlled-current source is connected to a subscriber line, and moreover, are time intervals which are a positive integer times as long as the period of hum noise.

More specifically, the present invention is a subscriber line impedance measurement method and measuring circuit that connects a controlled-current source to each of a pair of subscriber lines by way of switches and that measures sample values of transient voltage and transient current on these subscriber lines over a prescribed period of time. The prescribed time period is divided into a first half and a second half, the averages of the voltage and current within each of the first half and second half are detected and held, and finally, the difference in voltage at the beginning and end of the first half and the difference in voltage at the beginning and end of the second half are detected and held and an operation is performed according to a fixed numerical formula from these held values. At the same time, the measurement current supplied from the controlled-current source is controlled such that its rate of change over time remains at or below a fixed value, and in addition, the first-half measurement period and the second-half measurement period are set to an positive integer times as long as the period of hum noise.

By means of the above-described construction, the present invention calculates impedance from the transient response waveform of the voltage and current of a line, thereby obviating the need to wait for stabilization of the measurement current fed to the line and the line response voltage, and allowing a decrease in measurement time.

In addition, the occurrence of transient noise at a terminal can be prevented when the measurement current is first supplied, thereby improving measurement accuracy.

Moreover, because subscriber line impedance is measured based on sampling values at a prescribed measurement timing, the circuit can be constructed from holding means for voltage (sample) values and current (sample) values, and the subscriber line impedance measuring circuit can be realized through a simple circuit structure. In cases in which a commercial hum noise is superposed onto a subscriber line, by employing a measurement timing which is an positive integer times as long as the period of the hum noise, the hum noise is offset and does not appear in the average value of voltage (sample) values and current (sample) values, and in addition, because the phase of hum noise coincides at the end and beginning of the first-half and second-half measurement periods, the influence of hum noise can be eliminated by subtracting the voltage values at both timings.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 1:
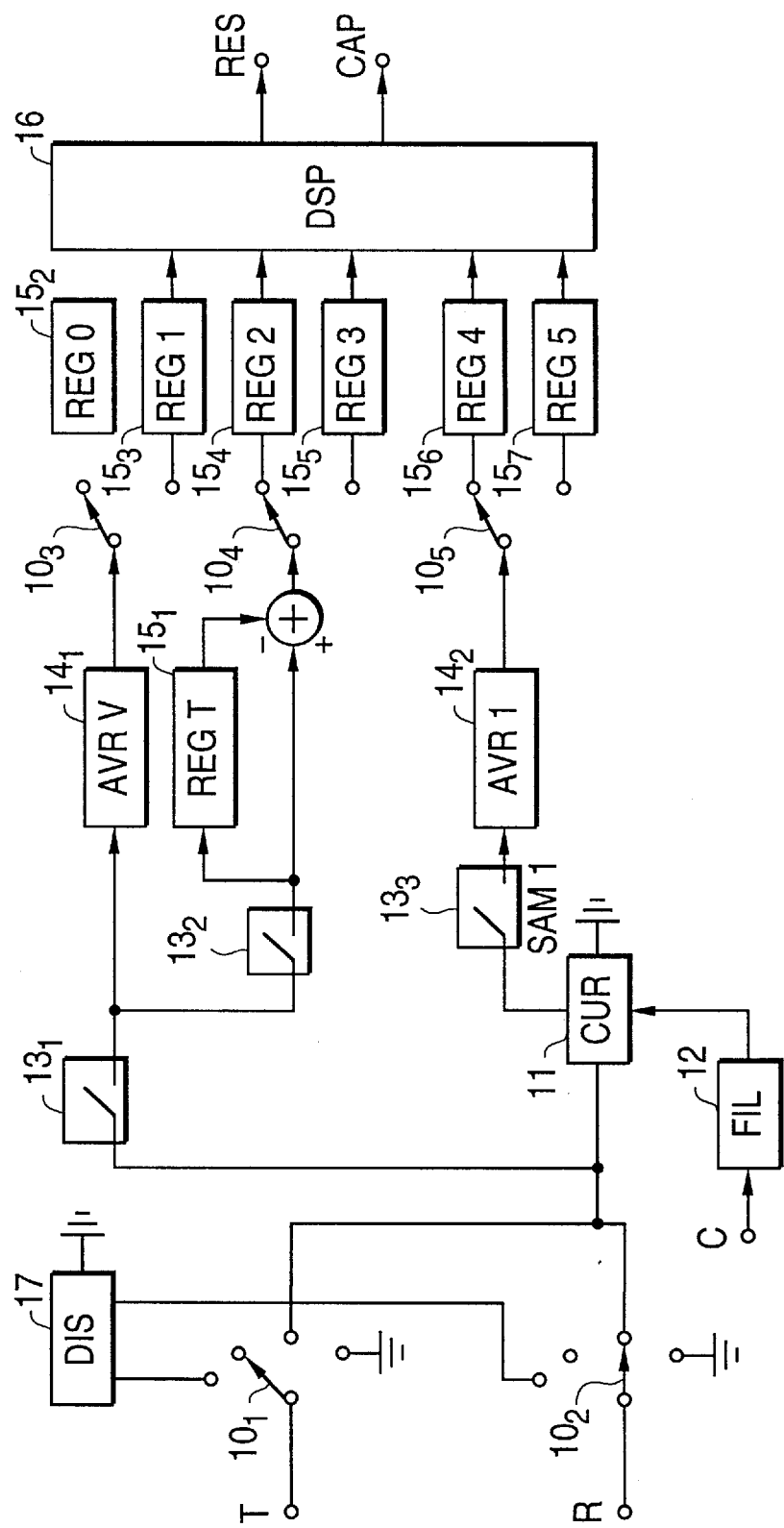
FIG. 1 is a block diagram showing the construction of an embodiment of the measuring circuit according to the present invention.

The construction of a measuring circuit according to an embodiment of the present invention will next be explained with reference to the accompanying figures. FIG. 1 is a block diagram showing the construction of the embodiment.

A pair of subscriber lines (not shown in the figure) are connected to terminals T and R, and the measurement current is supplied from controlled-current source 11 by way of switches $10_1$ and $10_2$. Using switches $10_1$ and $10_2$, the subscriber lines can each be individually switched so as to be grounded, open, or connected to controlled-current source 11. The measurement current supplied to the subscriber lines by controlled-current source 11 is controlled by control means 12 such that its rate of change over time is set at or below a fixed value. At the commencement of measurement, control means 12 is activated by a signal from control terminal C.

The voltage of the subscriber line is sampled every period Δt by sampler $13_1$, A/D (analog/digital) converted (the A/D converter is not shown in the figure), and conducted to average value detection means $14_1$, where an average value is calculated for each of the first-half interval and second-half interval of the measurement interval, and, by switching switch $10_3$, the average value of the first-half interval is accumulated in register $15_2$, and the average value of the second-half interval is accumulated in register $15_3$.

Further, voltage sample values for only the beginning and end of each half interval are passed by way of sampler $13_2$, the sample value of the beginning of first-half interval is first held in register $15_1$, and at the end of the first-half interval, the value held in register $15_1$ is subtracted from the sample value at this time, and the result accumulated in register $15_4$ by way of switch $10_4$ as the voltage difference of the first-half interval. Next, the sample value of the beginning of the second-half interval is held in register $15_1$, and at the end of the second-half interval, the value held in register $15_1$ is subtracted from the sample value at this time, switch $10_4$ is switched, and the result is accumulated in register $15_5$ as the voltage difference of the second-half interval. In addition, the end of the first-half interval and the beginning of the second-half interval have the same timing.

In the same way, the subscriber line current is sampled every sampling period Δt by sampler $13_3$, A/D (analog/digital) converted (the A/D converter is not shown in the figure), the average value over the first-half interval calculated by average value detection means $14_2$, and the result accumulated in register $15_6$ by way of switch $10_5$. Similarly, the average value over the second-half interval is calculated, and switching switch $10_5$, the result accumulated in register $15_7$.

At the point at which all measurement intervals end, the resistance value and capacitance value of the subscriber line are calculated by digital signal processing means 16 by means of the calculation formula to be described hereinbelow using the values held in each of registers $15_2$ to $15_7$, following which the resistance value is outputted from terminal RES and the capacitance value outputted from the terminal CAP.

Here, an A/D converter is used for digital processing of voltage sample values and current sample values in order to facilitate impedance calculation (to be described) by digital signal processing means 16. In cases in which the analog values are analog-processed, an A/D converter need not be employed.

Specific examples of each block circuit shown in FIG. 1 will next be explained with reference to FIGS. 2 and 3.

Figure 2:
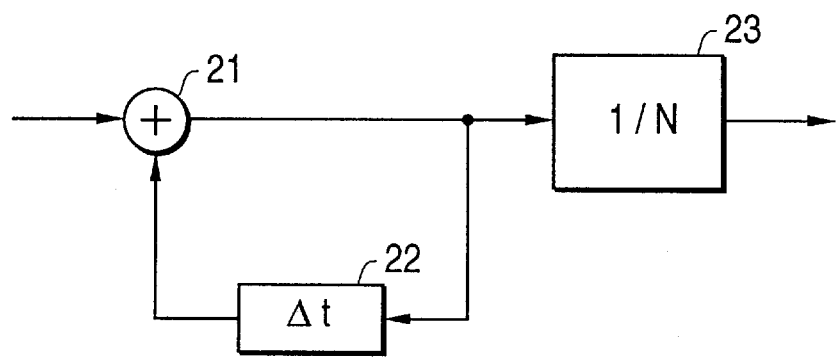
FIG. 2 is a block diagram showing an average-value detection circuit.

FIG. 2 is a block diagram showing one example of the construction of average value detection means $14_1$ or $14_2$ which calculates the average value of voltage and current sample values. In this figure, sample values are added to the preceding addition result at adder 21 for each sample, and then held in register 22, which has a delay time Δt equal to the sampling period Δt. At the end of first-half interval, the total cumulative result of sample values over the first-half interval are saved in register 22. This value is divided by the total number N of samples at divider 23 to find the arithmetic mean, and the result is outputted. The register is then initialized before the start of the second-half interval, and the average value is calculated for the second-half interval in the same manner.

In order to simplify the explanation in this example, the first-half interval and second-half interval are set equal to each other and the number of samples for both is N, but a difference in the number of samples for the first-half and second-half intervals or a difference in lengths of the first-half interval and second-half interval does not pose any particular problem. For the sake of simplicity in the following explanation, the number of samples for the two intervals is equal.

Figure 3:
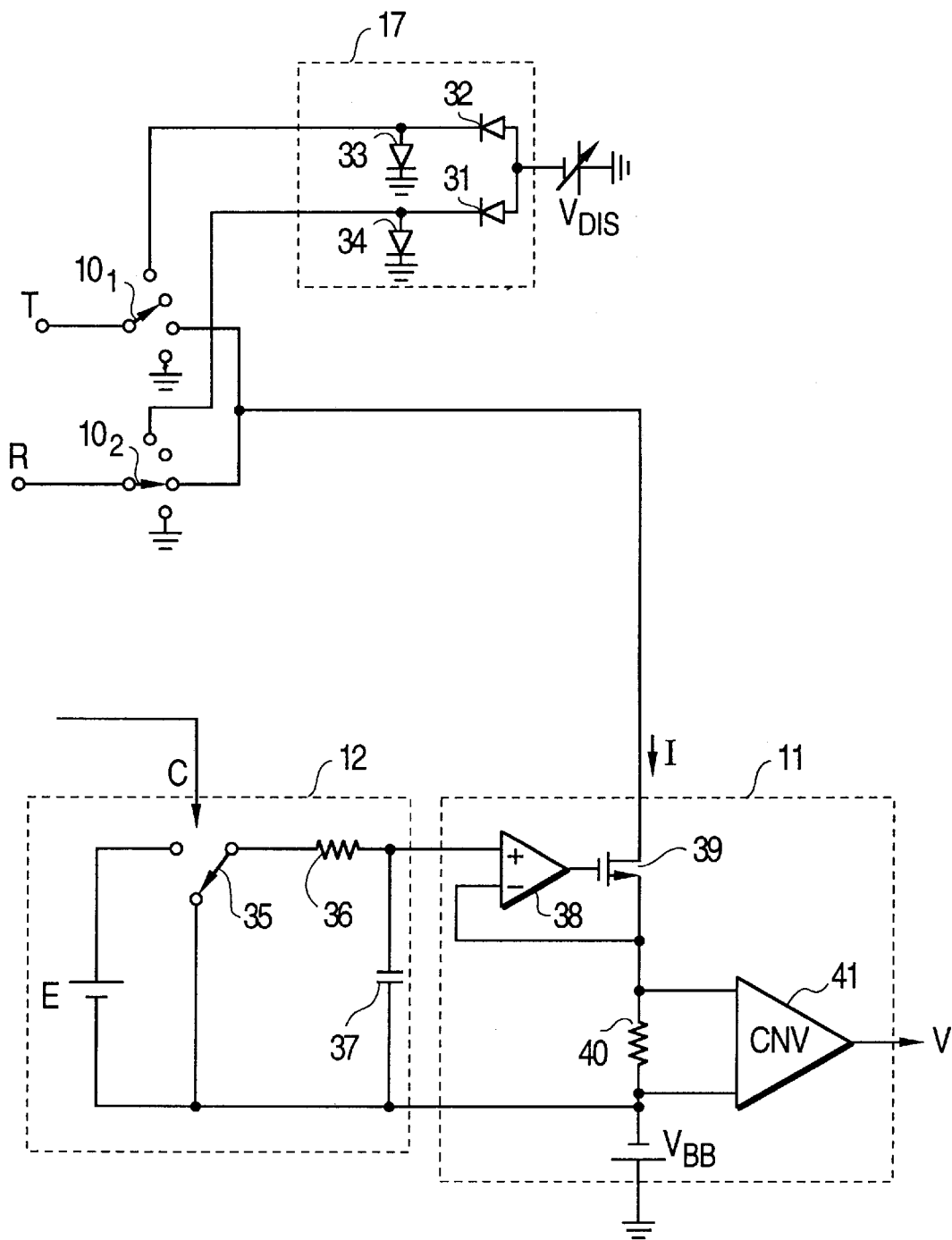
FIG. 3 is a circuit diagram showing the discharge circuit, control means, and controlled-current source of the present embodiment.

Next, one example of the configuration of discharge circuit 17, controlled-current source 11, and control means 12 is shown in FIG. 3.

Before measurement, switches $10_1$ and $10_2$ are both connected to discharge circuit 17, and parasitic capacitance in the subscriber lines or accumulated charge in the capacitance of the telephone are gradually discharged to ground. Discharge circuit 17 is composed of a diode bridge and variable voltage source $V_{DIS}$. Variable voltage source $V_{DIS}$ has an initial voltage on the order of, for example, −48 V, and has a voltage that gradually rises to 0 V. Negative voltage is generally impressed to subscriber lines from, for example, a telephone exchange, and as a result, the subscriber line side has negative polarity regarding parasitic charge with respect to the ground. Discharge is therefore effected by passage through diodes 31 and 32 connected to variable voltage source $V_{DIS}$.

On the other hand, regarding accumulated charge between lines, if for example, the subscriber line terminal T side has positive polarity and the subscriber line terminal R side has negative polarity, the discharge current flows along a route from the negative side terminal of $V_{DIS}$ to diode 31 between $V_{DIS}$ and terminal R, to terminal R, to capacitance between lines (not shown), to terminal T, to diode 33 between terminal T and ground, and finally to ground, thereby discharging charge between lines. In a case in which charging occurs at reverse polarity, the above-described diode bridge operates through diodes 32 and 34, and both the parasitic charge and the telephone capacitance charge are discharged. Control means 12 is caused to operate by an activation signal from control terminal C and supply of the measurement current begins.

Control means 12 is constructed from reference power source E, switch 35, resistance 36, and capacitance 37; and controlled-current source 11 is constructed from operational amplifier 38, N-channel field-effect transistor 39, limiting resistance 40, voltage converter 41, and station voltage source $V_{BB}$. Switch 35 is switched to reference power source E by an activation signal from the outside, whereupon a fixed voltage is inputted to a low-pass filter composed of resistance 36 and capacitance 37. Low-pass filter output is taken from the terminal of capacitance 37 and supplied to the non-inverting input terminal of operational amplifier 38. The output terminal of operational amplifier 38 is connected to the gate of field-effect transistor 39, and the inverting input terminal of operational amplifier 38 is connected to the source of field-effect transistor 39, and operational amplifier 38 operates as a current source equipped with N-channel field-effect transistor 39 for current buffer use in its output section. The measurement current flows in from the drain of field-effect transistor 39, passes through limiting resistance 40, flows into station voltage source $V_{BB}$ (generally, $V_{BB}$= −48 V), and returns to ground. Operational amplifier 38 operates as a voltage follower, and as a result, if the output voltage of low-pass filter is V with station voltage source $V_{BB}$ as a reference, terminal voltage of limiting resistance 70 is also V, and the current I flowing through this resistance is:

$$I = V/R1 \qquad (1)$$

where $R_1$ is resistance value of limiting resistance 40.

Because the input terminal of operational amplifier 38 and the gate of transistor 39 are both of high impedance, current flowing to them can be ignored, and accordingly, current I is equal to measurement current I supplied by controlled-current source 11. This current I is detected as the voltage drop of limiting resistance 40, is converted to voltage to ground V by voltage converter 41 and outputted to sampler $13_3$. Voltage converter 41 has the function of converting the voltage between the two input terminals to voltage V of ground reference, and is generally constructed from a level shifter.

The operation of the circuit will next be explained with reference to FIG. 1, beginning with a case in which impedance connected between subscriber lines is measured. Switch $10_1$ is grounded, switch $10_2$ is connected to controlled-current source 11, and measurement current is caused to flow between subscriber lines.

With this construction, the measurement current flows successively from ground, to switch $10_1$, to subscriber line terminal T, to subscriber line (not shown in the figure), to a terminal such as a telephone (not shown), to a subscriber line (not shown), to subscriber line terminal R, to switch $10_2$, to controlled-current source 11, and finally to ground. This can be termed a "normal measurement."

Subscriber lines are generally composed of copper and have the direct-current resistance of copper. When a telephone is connected and in an off-hook state, the carbon resistance of the microphone is chiefly measured as the direct-current resistance. The flow of a measurement current through these resistances generates a corresponding voltage. When the telephone is in an on-hook state, the subscriber lines have the composite impedance of direct-current blocking capacitance of the bell circuit and subscriber line resistance.

Explanation will next be given for a case in which switch $10_2$ is grounded, switch $10_1$ is connected to controlled-current source 11, and measurement is carried out.

With this construction, the measurement current successively flows from ground, to switch $10_2$, to subscriber line terminal R, to a subscriber line (not shown in the figure), to a terminal such as a telephone (not shown), to a subscriber line (not shown), to subscriber line terminal T, to switch $10_1$, to controlled-current source 11, and finally to ground. Such a case can be termed a "reverse measurement."

In normal measurement and reverse measurement, the direction of the measurement current flowing in the subscriber lines including the terminals is only reversed. Use of a non-linear element such as a diode at a terminal produces a difference in measurement results. The use of a non-linear element can be recognized through detection of this difference.

Explanation will next be given for a case of measurement in which switch $10_2$ is opened and switch $10_1$ is connected to controlled-current source 11.

With this construction, the measurement current successively flows from ground, to subscriber line impedance to ground (not shown), to a subscriber line (not shown), to subscriber line terminal T, to switch $10_1$, to controlled-current source 11, and finally to ground.

With this construction, impedance between the subscriber line on the terminal T side and ground is measured.

The impedance between a single line and ground is chiefly the parasitic capacitance and insulation resistance.

Next, measurement for a case in which switch $10_1$ is opened and switch $10_2$ is connected to controlled-current source 11.

With this construction, the measurement current successively flows from ground, to subscriber line impedance to ground (not shown in the figure), to a subscriber line (not shown), to subscriber line terminal R, to switch $10_2$, to controlled-current source 11, and to ground.

With this construction, the impedance between the subscriber line on the terminal R side and the ground is measured.

As described hereinabove, impedance between subscriber lines and impedance between a subscriber line and ground can be measured by switching switches $10_1$ and $10_2$.

In any of the cases described hereinabove, measurement current is supplied from controlled-current source 11, the voltage generated in a subscriber line is measured, the voltage sample values and the measurement current sample values are recorded, and the resistance and capacitance are calculated using the following calculation formulas. Resistance and capacitance referred to here are the values equivalently representing the composite impedance of subscriber lines and terminals in a parallel circuit of resistance R and capacitance C.

The beginning time of a first-half interval is t=0, the end time of the first-half interval and beginning of the second-half interval is t=T, and the end of the second-half interval is t=2T. If sampling is carried out during these intervals at every time interval $\Delta t$, and the number of samples in the first-half interval and second-half interval is N, then:

$$N \cdot \Delta t = T$$

If the value of voltage samples at time t=i (i=0, 1, 2, ..., N, N+1, ..., 2N) is Vi, the time series of voltage sample values is:

$$V_0, V_1, V_2, \ldots V_N, V_{N+1}, \ldots, V_{2N},$$

and the first-half interval samples are $V_1, \ldots V_N$, and the second-half interval samples are $V_{N+1}, \ldots, V_{2N}$.

Similarly, if current sample values are $I_i$ (i=0, 1, 2, ..., N, N+1, ..., 2N), the time series is:

$$I_0, I_1, I_2, \ldots, I_N, I_{N+1}, \ldots, I_{2N},$$

and the first-half interval samples are $I_1, \ldots I_N$, and the second-half interval samples are $I_{N+1}, \ldots I_{2N}$.

If the average value of voltage over the first-half interval is Vf, the average value of voltage over the second-half interval is Vb, the average value of current over the first-half interval is If, the average value of current over the second-half interval is Ib, and moreover, the difference in voltage between the beginning and end of the first-half interval is $\Delta$Vf, and the difference in voltage between the beginning and end of the second-half interval is $\Delta$Vb, then:

$$Vf = \sum_{i=1}^{N} Vi/N \tag{2}$$

$$Vb = \sum_{i=N+1}^{2N} Vi/N \tag{3}$$

$$If = \sum_{i=1}^{N} Ii/N \tag{4}$$

$$Ib = \sum_{i=N+1}^{2N} Ii/N \tag{5}$$

$$\Delta Vf = V_T - V_O \tag{6}$$

$$\Delta Vb = V_{2T} - V_T \tag{7}$$

The derivation of the calculation formulas for resistance and capacitance will be explained hereinbelow, but the results are as follows:

$$\text{Resistance } R = (\Delta Vb \cdot Vf - \Delta Vf \cdot Vb)/(\Delta Vf \cdot Ib - \Delta Vb \cdot If) \tag{8}$$

$$\text{Capacitance } C = (Vf \cdot Ib - Vb \cdot If) \cdot T/(\Delta Vf \cdot Vb - \Delta Vb \cdot Vf) \tag{9}$$

Resistance and capacitance are calculated using these formulas.

The correspondence between each of the above-described values and registers $15_2$–$15_7$ is as follows:

Register $15_2$ ... Vf; Register $15_3$ ... Vb; Register $15_4$ ... $\Delta$Vf; Register $15_5$ ... $\Delta$Vb; Register $15_6$ ... If; Register $15_7$ ... Ib As is clear from formulas (2) to (9) above, the addition of hum noise will produce no apparent effect because the measurement interval is an integer times as long as the hum noise period. In other words, the positive component and negative component are canceled in the average value, and influence from hum noise does not appear. Values of the same phase as the hum noise are also included in $V_O$, $V_T$, $V_{2T}$, and as a result, subtraction cancels the effect of hum noise from the voltage differences.

Figure 4:
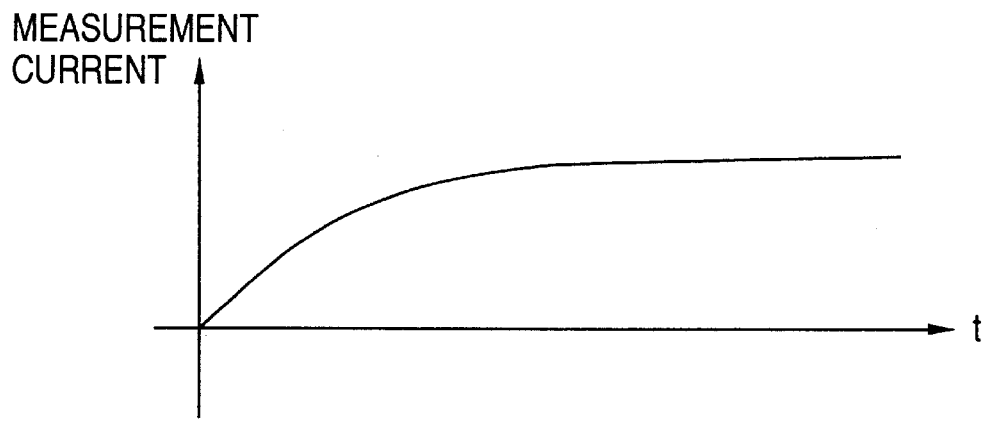
FIG. 4 shows the controlled-current waveform of the present embodiment.
Figure 5:
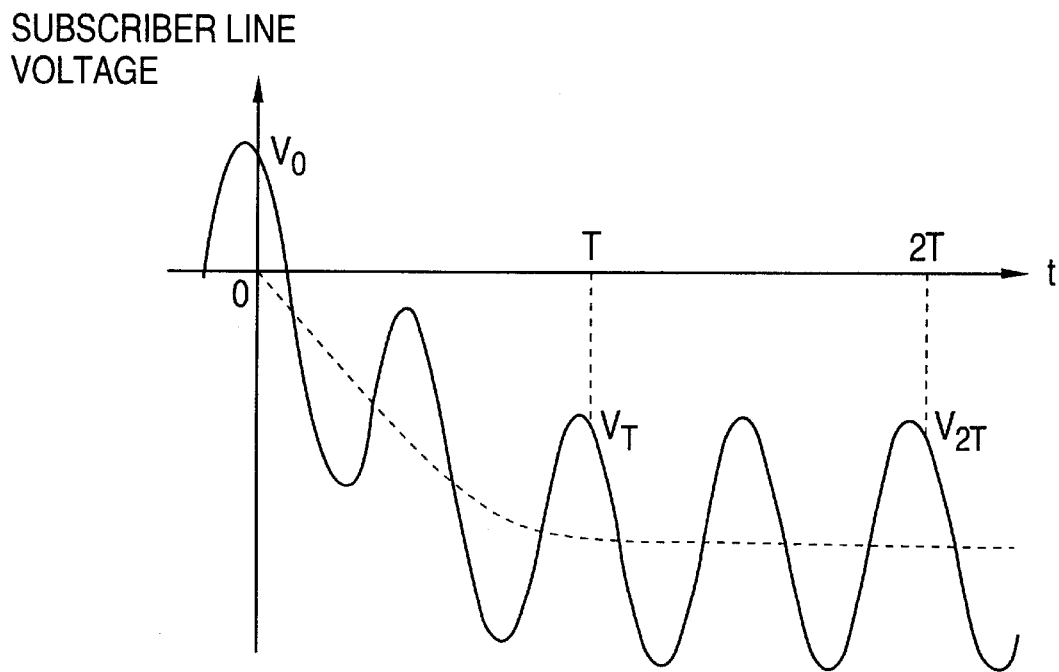
FIG. 5 shows the voltage waveform of a subscriber line in the present embodiment (with superposed hum noise).

A timing chart of the present embodiment will next be explained with reference to FIGS. 4 and 5. FIG. 4 shows the controlled-current waveform. According to the above-described formula (1), this waveform is identical to the output waveform of the low-pass filter circuit. FIG. 5 shows one example of the subscriber line voltage at such a time.

FIG. 5 shows that the subscriber line voltage falls over time. Because controlled-current source 11 is connected to negative station voltage source $V_{BB}$, the measurement current flows in a direction into controlled-current source 11, and subscriber line voltage is therefore of negative polarity. The broken line in FIG. 5 illustrates a case in which hum noise is not present. The superposition of hum noise in this case produces the undulating waveform shown by the solid line. At time t=0, the voltage sample value is $V_O$, which is generally not 0 V due to hum noise. The voltage sample value is $V_T$ at time t=T, i.e., at the border between the first-half and second-half intervals, but this value contains the same hum noise as the value at time t=0 because the first-half interval is an integer times as long as the period of hum noise. Similarly, the voltage sample value is $V_{2T}$ at the end of the second-half interval, but the hum noise included in this value is again the same value as for time t=T. Accordingly, hum noise is not included in the-difference in voltage between the beginning and end of each of the first-half and second-half intervals.

The operation of the controlled-current source 11 will next be explained.

Figure 6:
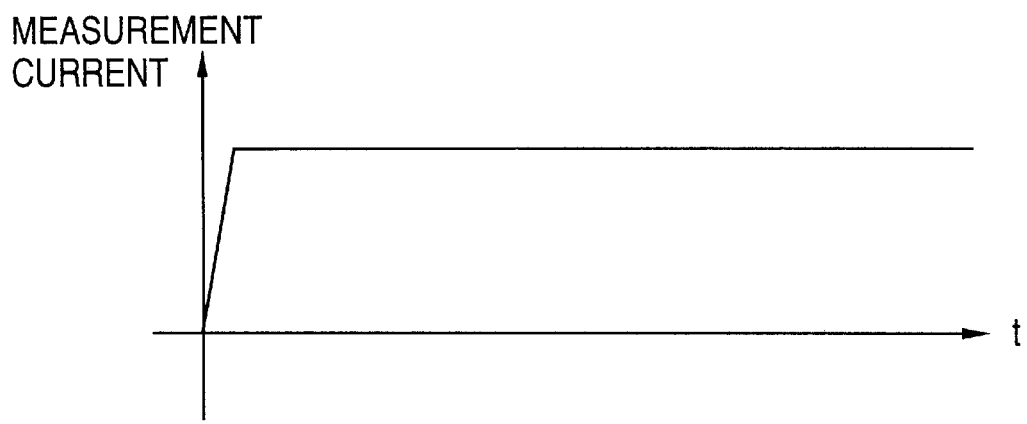
FIG. 6 shows a measurement-current waveform in the prior art.
Figure 7:
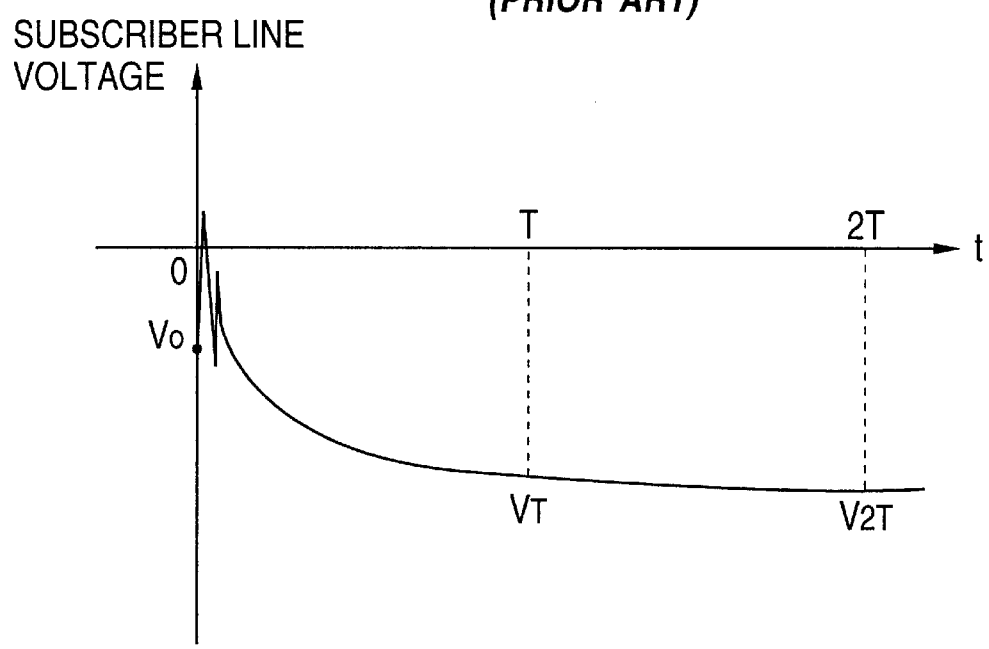
FIG. 7 shows subscriber-line voltage waveform in the prior art (with superposed transient noise).
Figure 8:
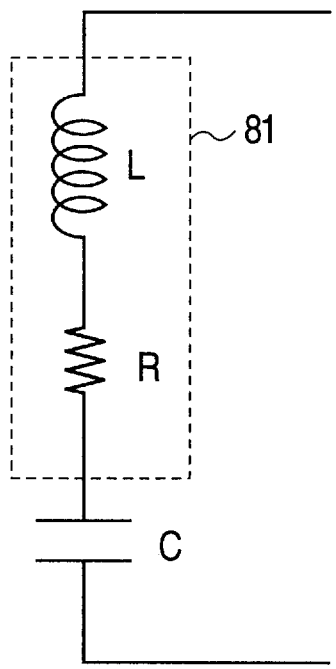
FIG. 8 shows the bell circuit of a telephone.

FIGS. 6 and 7 show one example of the measurement current and subscriber line voltage in a case in which controlled-current source 11 is not used (Prior Art). In the case shown in FIG. 6, the measurement current is raised from 0 to a fixed value in a short time interval. In such a case, transient noise as shown in FIG. 7 may occasionally occur in the subscriber line voltage. The chief cause for this is in the bell circuit of the telephone shown in FIG. 8. Essentially, because the coil 81 of the electromagnet in the bell circuit has inductance L, changes in current I give rise to a counter electromotive force $V_C$:

$$V_C = L \times dI/dt \quad (10)$$

L has a value of several henrys, and consequently, as is clear from formula (10), if the change in I over time is steplike, $V_C$ increases proportionately, and this produces a mutual reaction with subscriber line impedance and the impedance within the terminal telephone, and therefore gives rise to transient noise.

For example, if L=110H (henrys), I=1 mA, and the rise time is 1 mS, formula (10) shows that the counter electromotive force of the inductance of the bell circuit will be:

$$V = 110\ H \times 1\ mA\ /\ 1\ mS = 110\ V$$

In contrast, if, for example, the composite resistance of the subscriber line and terminal is 1 kΩ. the subscriber line voltage that is to be measured when a current of I=1 mA flows will be:

subscriber line voltage=1 mA×1 kΩ=1 V

This value is two decimal places smaller than the above-described counter electromotive force. The transient noise therefore gives rise to great measurement error.

As shown in FIG. 7, the time of occurrence of this transient noise is immediately after time t=0, and the voltage sample value $V_0$ of this time therefore includes transient noise. This transient noise obviously has ended by times t=T and t=2T, and transient noise is therefore not included in $V_T$ and $V_{2T}$. Consequently, despite the calculation of voltage difference, transient noise will not be canceled and will remain, leading to a large error in the computation results.

The object of measuring subscriber line impedance is to detect damage such as a short-circuited or disconnected line, or to detect whether or not a telephone is connected. As for the inductance of the bell circuit, supplying the measurement current with a gradual change by the controlled-current source is equivalent to supplying a direct current which gradually increases and the counter electromotive force of the coil is sufficiently small and can be ignored. Consequently, only the coil resistance will measured and the effect of inductance will not be apparent. As a result, measurement by this method allows measurement of direct-current blocking capacitance without interference caused by inductance. This capacitance is determined as a fixed value by the telephone, so the number of telephones that are connected can be detected by finding the capacitance value.

An explanation of the impedance calculation formulas will next be given with reference to FIG. 9.

Figure 9:
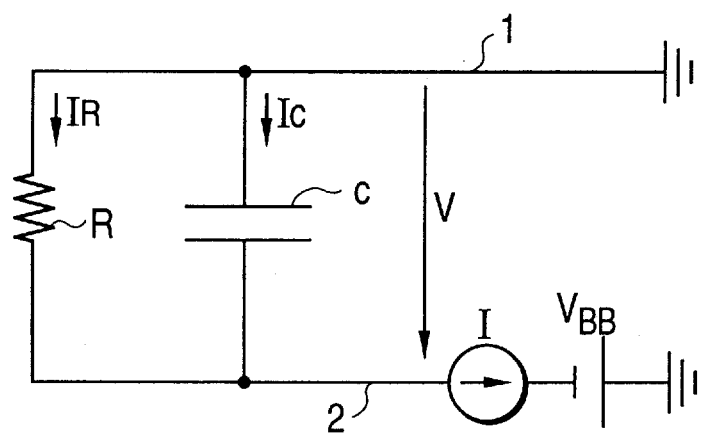
FIG. 9 is a circuit diagram showing the combined impedance of subscriber line impedance and terminal impedance modeled as an equivalent parallel circuit of resistance and capacitance.

FIG. 9 shows the combined impedance of subscriber lines and terminals by a parallel circuit of resistance R and capacitance C. Here, if a current I is flowing, the current that flows through resistance R and capacitance C is $I_R$ and $I_C$, respectively, the subscriber line voltage is V (negative) and time is t, then:

$$I = I_R + I_C \quad (11)$$

$$I_R = -V/R \quad (12)$$

$$I_C = -C \cdot dV/dt \quad (13)$$

If formulas (12) and (13) are substituted in formula (11), then:

$$I = -V/R - C \cdot dV/dt \quad (14)$$

If formula (14) is integrated over t=0 to T (first-half interval) and over t=T to 2T (second-half interval), then $$\int_0^T I\,dt = -(1/R) \cdot \int_0^T V\,dt - C(V_T - V_0) \quad (15)$$

$$\int_T^{2T} I\,dt = -(1/R) \cdot \int_T^{2T} V\,dt - C(V_{2T} - V_T) \quad (16)$$

By using formulas (15) and (16) to find C and R, approximating the definite integral within the formulas, and changing the form to that of the summation indicated by formulas (2) to (5), formulas (8) and (9) can be obtained.

In the operation of the embodiment of the present invention described hereinabove, subscriber line impedance is measured during a fixed interval after connecting a subscriber line to a controlled-current source by measuring the voltage and current. Since the controlled-current source has a prescribed rate of change in the rise section and the current of the current source changes during the measurement interval, the average current must be measured as well as the average voltage.

The present invention is a means of calculating the impedance by substituting the measurement values of the transient state into an equation representing the transient state of a subscriber line after connecting a controlled-current source. Therefore, the fixed time interval of this measurement can be any time interval up to the completion of the transient state, and the present invention can effect high-speed impedance measurement in a short interval within a transient state.

In the embodiment of the present invention, the measurement interval is divided into a first half and a second half which are two successive time intervals, and these two measurement intervals may be within the transient state of a subscriber line connected to a current source or may be any time intervals containing a transient state.

More specifically, the two measurement intervals of the embodiment may partially overlap or may be intervals separated by time. In other words, the time intervals, including their beginning and end points, may be set to any arbitrary time interval so long as the two intervals are not identical.

Moreover, in the embodiment, two impedances are measured based on the results of two time measurements of the two intervals, but if there are a plurality of items to be measured and one equation of the transient state includes a plurality of unknowns, it is clear from the principles of this invention that the number of measurement intervals must be set to that number of unknowns.

The present invention as described in the foregoing explanation enables measurement of impedance in the transient state of subscriber lines by application of a measurement current, and therefore enables extremely high-speed measurement.

In addition, the use of a controlled-current source allows suppression of the generation of transient noise at the time of applying current and blocks the influence of transient noise. Moreover, highly accurate impedance measurement is enabled because the effect of hum noise is blocked.

Finally, the present invention enables simplification of circuit structure by allowing construction of an impedance measuring circuit using holding circuits for voltage values and current values.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A subscriber line impedance measurement method for measuring impedance of subscriber lines during a time interval of transient state after connecting a current source to said subscriber lines;

comprising steps in which:

a controlled-current source is connected to a subscriber line, current is allowed to flow, giving rise to a transient state;

a measurement time interval set within the duration of a transient state is divided into two intervals, the voltage difference between subscriber line voltages at the beginning and end of each of the two intervals is measured, and the average voltage and average current of the subscriber line over each of the two intervals is measured; and subscriber line impedance is calculated by using the obtained measurement values in a prescribed numerical formula corresponding to said transient state of the subscriber lines.

2. A subscriber line impedance measurement method according to claim 1 wherein said subscriber lines are a pair of metallic paired lines, one of which is connected to said controlled-current source and the other of which is connected to ground, or is disconnected, and measurement of impedance between subscriber lines or impedance between a subscriber line to ground is performed from the subscriber line on the controlled-current source side.

3. A subscriber line impedance measurement method according to claim 1 wherein the rate of change over time of current of said controlled-current source is controlled to a fixed value or lower at the time of connecting said controlled-current source to a subscriber line.

4. A subscriber line impedance measurement method according to claim 1 wherein said two measurement intervals are a first half and second half of fixed time interval within a transient state that are continuous from the time said controlled-current source is connected to a subscriber line.

5. A subscriber line impedance measurement method according to claim 1 wherein said two measurement intervals are a positive integer times as long as the period of hum noise.

6. A subscriber line impedance measurement method according to claim 2 wherein the rate of change over time of current of said controlled-current source is controlled to a fixed value or lower at the time of connecting said controlled-current source to a subscriber line.

7. A subscriber line impedance measuring circuit for measuring impedance of subscriber lines composed of a pair of metallic paired lines, comprising:

a controlled-current source connected to one of the subscriber lines and through which current passes;

voltage difference detection means that detects voltage difference between subscriber line voltages at the beginning and end of each of two intervals, said two intervals being predetermined by dividing a time interval of initial transient state occurring when said controlled-current source is connected and current first flows;

average voltage/current detection means that measures average voltage and average current of the subscriber line over each of a first-half interval and a second-half interval of said time interval of initial transient state; and arithmetic means that calculates subscriber line impedance using said detected voltage differences, said average voltages and said average currents in a prescribed numerical formula corresponding to said transient state of subscriber lines.

8. A subscriber line impedance measuring circuit according to claim 7 wherein one of said subscriber lines is connected to said controlled-current source, the other subscriber line is connected to ground or is disconnected, and impedance between subscriber lines or subscriber line-to-ground impedance is measured from the subscriber line on the controlled-current source side.

9. A subscriber line impedance measuring circuit according to claim 7 wherein said controlled-current source has control means which controls the rate of change over time of current of said controlled-current source to a fixed value or lower at the time of connecting said controlled-current source to a subscriber line.

10. A subscriber line impedance measuring circuit according to claim 7 wherein said two measurement intervals are a first half and second half of fixed time interval within a transient state that are continuous from the time said controlled-current source is connected to a subscriber line.

11. A subscriber line impedance measuring circuit according to claim 7 wherein said two measurement intervals are a positive integer times as long as the period of hum noise.

12. A subscriber line impedance measuring circuit according to claim 8 wherein said controlled-current source has control means which controls the rate of change over time of current of said controlled-current source to a fixed value or lower at the time of connecting said controlled-current source to a subscriber line.

* * * * *